(12) United States Patent
Hermann et al.

(10) Patent No.: US 7,120,003 B2
(45) Date of Patent: Oct. 10, 2006

(54) CIRCUIT ARRANGEMENT WITH POWER FACTOR CORRECTION, AS WELL AS A CORRESPONDING APPLIANCE

(75) Inventors: Wolfgang Hermann, Tennenbronn (DE); John Stolte, Villingen-Schwenningen (DE); Jean-Paul Louvel, Brigachtal (DE)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 10/511,834

(22) PCT Filed: Apr. 12, 2003

(86) PCT No.: PCT/EP03/03826
§ 371 (c)(1),
(2), (4) Date: May 18, 2005

(87) PCT Pub. No.: WO03/090335
PCT Pub. Date: Oct. 30, 2003

(65) Prior Publication Data
US 2005/0206321 A1    Sep. 22, 2005

(30) Foreign Application Priority Data
Apr. 22, 2002 (DE) ................ 102 17 951

(51) Int. Cl.
*H01F 13/00* (2006.01)
(52) U.S. Cl. .................... 361/149; 361/150
(58) Field of Classification Search ............ 361/150, 361/149
See application file for complete search history.

(56) References Cited

U.S. PATENT DOCUMENTS

| | | | |
|---|---|---|---|
| 4,275,438 A * | 6/1981 | Stirniman | 363/136 |
| 4,295,078 A | 10/1981 | Wilmarth | |
| 4,866,525 A | 9/1989 | Rodriguez-Cavazos et al. | |
| 5,170,096 A * | 12/1992 | Kang et al. | 315/8 |
| 5,619,404 A * | 4/1997 | Zak | 363/21.09 |
| 5,701,237 A * | 12/1997 | Yang | 363/20 |
| 5,715,130 A | 2/1998 | Ikeda | |
| 5,742,127 A * | 4/1998 | Ahn | 315/8 |
| 5,825,131 A * | 10/1998 | Kim | 315/8 |
| 6,674,271 B1 * | 1/2004 | Choo et al. | 323/282 |

FOREIGN PATENT DOCUMENTS

| | | |
|---|---|---|
| DE | 2835610 | 2/1980 |
| DE | 3418076 | 11/1985 |
| EP | 598267 | 5/1994 |

* cited by examiner

OTHER PUBLICATIONS

Copy of Search Report Dated Aug. 22, 2003.

*Primary Examiner*—Stephen W. Jackson
*Assistant Examiner*—Scott Bauer
(74) *Attorney, Agent, or Firm*—Joseph J. Laks; Harvey D. Fried; Christine Johnson

(57) ABSTRACT

The circuit arrangement has a mains connection, a mains switch with two switching contacts, a demagnetization coil and a switch-mode power supply, which contains a driver circuit for producing a control voltage for the switching transistor of the switch-mode power supply. A first switching contact of the mains switch is arranged between the mains connection and the demagnetization coil in order to switch the demagnetization coil on and off, and the second switching contact is connected to a supply or control voltage for the driver circuit, in order to switch off the switch-mode power supply. In consequence, a power factor coil can be used between the mains connection and the switch-mode power supply for power factor correction, without the mains switch being loaded by the inductance of the power factor coil.

12 Claims, 2 Drawing Sheets

CIRCUIT ARRANGEMENT WITH POWER FACTOR CORRECTION, AS WELL AS A CORRESPONDING APPLIANCE

This application claims the benefit, under 35 U.S.C. §365 of International Application PCT/EP03/03826, filed Apr. 12, 2003, which was published in accordance with PCT Article 21(2) on Oct. 30, 2003 in English and which cliams the benefit of German patent application No. 10217951.4, filed Apr. 22, 2002.

BACKGROUND OF THE INVENTION

Switch-mode power supplies produce a heavily pulsed load on the electrical power supply system, which leads to harmonic currents in electrical power supply systems. This load occurs in the region of the voltage maxima of the sinusoidal mains voltage, at which voltage maxima an energy-storage capacitor for the switch-mode power supply is recharged. Appliances having a relatively high power consumption, such as televisions with relatively large picture tubes, now therefore have to comply with specific regulations relating to harmonic currents. The harmonic load on the electrical power supply system caused by an appliance can in this case be stated as a so-called power factor.

Widely differing circuit concepts are known for improving the power factor, for example from DE-A-196 10 762, EP-A-0 700 145 and U.S. Pat. No. 5,986,898. These contain a second current path with a coil between the mains rectifier and the primary winding of the transformer, with the inductance of this coil acting like a current pump, which is controlled by a switching transistor in the switch-mode power supply and in consequence broadens the pulsed current flow of the switching-mode power supply.

A further possible way to improve the power factor of a switch-mode power supply is to use a coil in the input area of the switch-mode power supply. This coil is also referred to as a 50 Hz coil, a mains frequency coil or a power factor coil. In order to avoid confusion with other coils, the description therefore always uses the expression power factor coil for this coil.

However, this power factor coil has the disadvantage that the current flow in the power factor coil is interrupted suddenly when the mains switch is operated in order to switch off the appliance. The energy which is stored in the coil must be dissipated, however. Since the open mains switch represents the highest impedance in the circuit, a very high voltage is therefore developed across the switching contacts of the mains switch, and causes an arc. This causes the mains switch to age more quickly, and the switch represents a safety risk since, in the worst case, it becomes a potential fire source.

Other mains switches, in which the switching contacts open at a slow rate, are likewise at risk. In this case, although the voltage across the contacts is not very high, an arc is nevertheless produced, however, and burns until the end of the corresponding power supply system half-cycle. In this case as well, a large amount of energy is lost in the switch, which leads to rapid aging.

BRIEF SUMMARY OF THE INVENTION

The circuit arrangement has a mains connection, a mains switch with two switching contacts, a demagnetization coil and a switch-mode power supply, which contains a driver circuit for producing a control voltage for the switching transistor of the switch-mode power supply. A first switching contact of the mains switch is arranged here between the mains connection and the demagnetization coil in order to switch the demagnetization coil on and off, and the second switching contact is connected to a supply or control voltage for the driver circuit, in order to switch off the control voltage for the switching transistor or in order to switch off the switch-mode power supply.

This has the advantage that a power factor coil between the mains connection and the switch-mode power supply can be used for power factor correction, and that the mains switch is not loaded by the inductance of the power factor coil. Admittedly, this results in the switch-mode power supply being connected to the mains even when it is switched off. However, this is not disadvantageous for the user and leads only to a slight power loss resulting from the starting circuit, when the switch-mode power supply is switched off.

The circuit arrangement can be used in particular in appliances having a picture tube, for example televisions and computer monitors. This mains switch circuitry in this case ensures that the picture tube is demagnetized whenever the appliance is switched on.

BRIEF DESCRIPTION OF THE DRAWINGS

The invention will be explained in more detail in the following text using, by way of example, an exemplary embodiment which is illustrated schematically in the figures, in which.

DETAILED DESCRIPTION OF PREFERRED EMBODIMENTS

Figure 1:
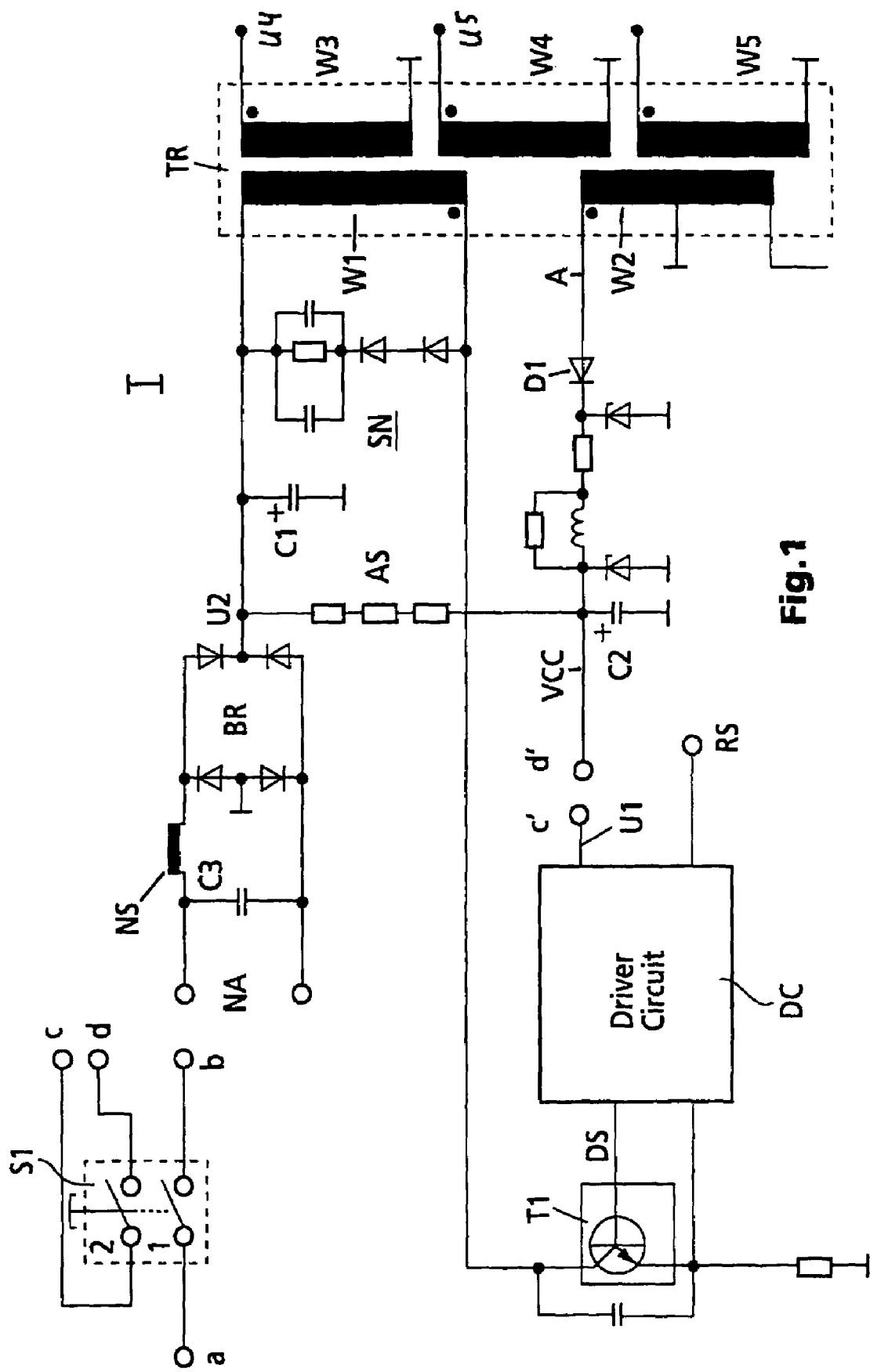
FIG. 1 shows a circuit arrangement having a mains connection, a power factor coil and a switch-mode power supply, as well as a mains switch.

FIG. 1 shows a switch-mode power supply I schematically, which has a rectifier means, in this exemplary embodiment a bridge rectifier BR with four diodes, an energy-storage capacitor C1 and transformer TR with a primary winding W1, an auxiliary winding W2 arranged on the primary side and secondary windings W3, W4 and W5 arranged on the secondary side. The energy-storage capacitor C1 is in this case arranged between the bridge rectifier BR and the primary winding W1. A switching transistor T1 is connected in series with the primary winding W1 and is controlled by a control voltage DS for a driver circuit DC. A supply voltage VCC is provided for operation of the switch-mode power supply via the auxiliary winding W2, a diode D1 and capacitor C2, and is supplied to the driver circuit DC.

The switch-mode power supply I in FIG. 1 is a part of a circuit arrangement which also has a mains connection NA, a demagnetization coil (which is not illustrated) and a mains switch S1 with two switching contacts 1, 2. The circuit arrangement is preferably integrated in an appliance, for example a television, which has a picture tube.

Picture tubes, which are used in televisions or computer monitors, need to be demagnetized from time to time in order to preserve the color purity of the picture tube. This is accomplished by means of a demagnetization coil, through which an AC voltage normally flows during the process of switching on the appliance. The 220 volt mains voltage is used as the AC voltage in this case and produces a high current surge at the time when the appliance is switched on, and which then subsequently decays gradually. The decay is accomplished by means of a posistor, which is heated by the high current with its impedance in consequence becoming high.

In order to regulate the switch-mode power supply, the driver circuit DC is supplied with a regulating signal RS which is derived from a supply voltage U4 on the secondary side, for example from the system voltage in a television, and is transmitted via an opto coupler or an isolating transformer (which is not illustrated) to the primary side of the switch-mode power supply.

A so-called snubber network SN is arranged in parallel with the primary winding W1 and is used to damp voltage spikes which occur during the process of switching off the switching transistor T1. The switch-mode power supply also contains a starting circuit AS, which supplies the driver stage DC with a current for the starting phase of the switch-mode power supply after the appliance in which the circuit arrangement is integrated has been switched on. The starting circuit AS is normally a high-value resistor chain, which produces a connection between the bridge rectifier BR and the capacitor C2. During operation, the supply voltage VCC is produced by the auxiliary winding W2, as well as by the diode D1 and the filter capacitor C2.

The switch-mode power supply illustrated in the figure preferably operates on the basis of the fly back converter principle, although other circuit principles are likewise possible. Fly back converters are preferably used in entertainment electronics appliances, for example in televisions and video recorders. In a fly back converter, energy is in this case stored in the transformer TR during the phase in which the switching transistor T1 is switched on, and is then subsequently transmitted to the windings W3–W5 on the secondary side, and to the auxiliary winding W2 on the primary side, in the phase during which the switching transistor is switched off. Fly back converters are used both as AC/DC converters and as DC/DC converters.

Switch-mode power supplies of this type have a low power factor, since the energy-storage capacitor C1 is recharged only in the region of the voltage maxima and minima of the 50 Hz mains voltage, when the output voltage U2 of the bridge rectifier BR exceeds the voltage value across the energy-storage capacitor C1. One simple possible way to improve the power factor of a switch-mode power supply is to use a mains frequency coil or power factor coil NS, which is arranged between the mains connection NA and the energy-storage capacitor C1. In this exemplary embodiment, it is connected between the mains connection NA and the mains rectifier BR.

The power factor coil NS results in the pulsed current flow which is used to recharge the energy-storage capacitor C1 being broadened and shifted in phase, since the inductance of this coil, for example 50 mH, means that the current flow through the coil rises only gradually, and decays again in a damped manner. A power factor which complies with the requirements is achieved in this case by appropriate choice of the inductance value.

FIG. 1 likewise shows a mains switch S1, which has two switching contacts 1 and 2, as well as corresponding connections a and b for the switching contact 1, and c and d for the switching contact 2. The mains switch S1 is in this case normally arranged on the front face of the appliance, such that it is easily accessible for a user. The connections c and d are in this case according to the invention connected to the connections c' and d' for switching the driver circuit DC of the switch-mode power supply on and off, and the connections a and b are connected to the magnetization coil for switching the demagnetization coil on and off.

In consequence, the power factor coil NS is not arranged in the current path of the mains switch S1. The mains switch is therefore not loaded by the power factor coil NS when the appliance is switched on and off. At the same time, this arrangement ensures that the demagnetization coil is switched on, in order to demagnetize the picture tube, on each occasion when the appliance is switched on.

Figure 2:
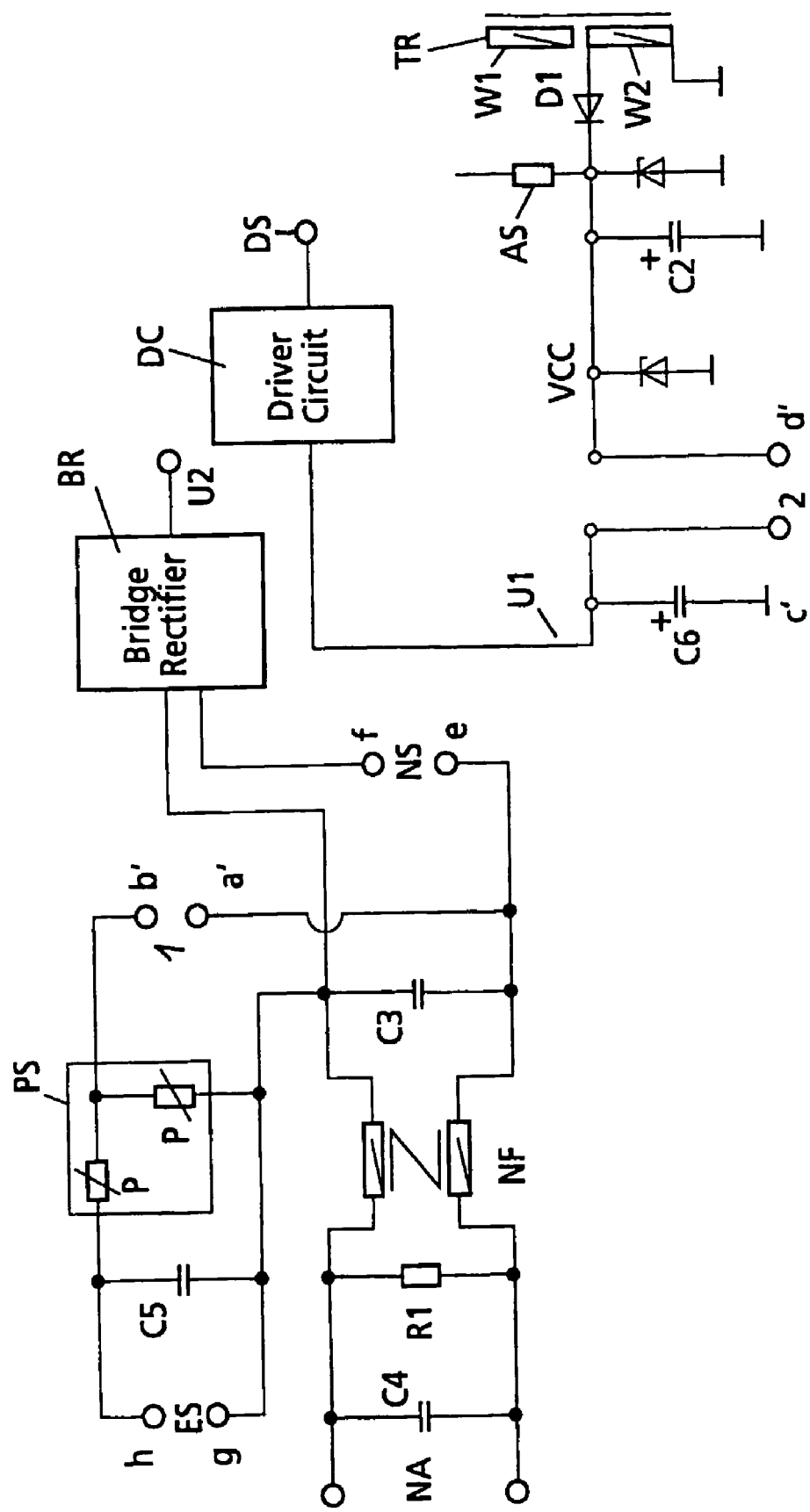
FIG. 2 shows the use of the arrangement in a chassis of a television.

FIG. 2 shows the major components of the circuit arrangement, to the extent that they are integrated on a chassis of a television in an advantageous refinement. On the input side, the arrangement has a filter section with a mains filter NF, capacitors C3 and C4 and a resistor R1, which filter section is connected to the mains connection NA of the arrangement. This filter section prevents radiated interference from the appliance entering the mains system and suppresses any interference which is already present on the main system. On the output side, the filter section is connected to the bridge rectifier BR, which provides the rectified voltage U2 for operation of the switch-mode power supply.

Connections e and f are arranged in the connection between the bridge rectifier and the filter section, to which the power factor coil NS, which is not illustrated in FIG. 2, is connected. The power factor coil is arranged separately, so that the switch-mode power supply can be kept compact and, in particular, such that an already existing switch-mode power supply which does not have power factor correction can be used without any major design change. The arrangement of the power factor coil NS upstream of the bridge rectifier BR means that it is located in the current path of the sinusoidal AC voltage of the mains system.

The driver circuit DC and the transformer TR for the switch-mode power supply are indicated only schematically in FIG. 2, to the extent that it is necessary for understanding of the invention. As already explained with reference to FIG. 1, a diode D1 and a capacitor C2 are arranged on the auxiliary winding W2, which is arranged on the primary side, in order to produce the operating voltage VCC for the driver circuit. Two connection points c' and d' are arranged on the chassis in the connection between the capacitor C2 and the driver circuit DC, and are connected to the connection points c and d of the mains switch S1.

A capacitor C6 with a capacitance of 1 µF is also advantageously connected to ground between the connection c' and the driver circuit DS, and is used to avoid switch bouncing of the switching contact 2 and to provide filtering for the long supply line to the mains switch S1. The capacitance of this capacitor in this case also influences the number of switching cycles after which the switching transistor T1 is completely switched off.

A posistor PS and a capacitor C5 to which the demagnetization coil ES (which is not illustrated) is connected via connection points g and h are also arranged on the chassis. On the input side, the posistor PS is arranged in parallel with the capacitor C3. Connection points a' and b', which are connected to the connection points a and b of the main switch S1, are in this case located in a supply. In consequence, the demagnetization coil ES is switched on whenever the mains switch S1 is operated in order to switch on the appliance. The posistor PS in this case ensures a large current surge at the moment of switching on, which is reduced continuously to a low loss level by the heating of the posistor.

Whenever the appliance is switched, when the mains switch S1 is pressed on, the switching contacts 1 and 2 are closed, so that the switch-mode power supply can be started via the switching contact 2, since the driver circuit DC is in this case supplied with the operating voltage VCC. On being switched on, the switch-mode power supply thus behaves in precisely the same way as when using the mains switch S1 in appliances of a conventional type.

Whenever the appliance is switched off, when the mains switch S1 is opened, the switching contact 2 switches off the switching transistor T1 in the short time, so that no more energy is transmitted in the transformer TR to the second windings W2–W5. The switching voltage DS for the switching transistor T1 is switched off directly or indirectly by the driver circuit. The switching contact 2 is advantageously connected to the connection points c' and d', as described with reference to FIG. 2, so that the driver circuit DC is disconnected from the supply voltage VCC during the switching-off process. However, another voltage of the driver circuit DC, for example a control voltage for the driver circuit DC, can also be switched off in a corresponding manner by the switching contact 2, or the switching contact 2 can be used to regulate the regulating signal RS at a predetermined voltage level, so that the switching transistor T1 is likewise switched off permanently.

According to the invention, the mains connection NA is thus connected to the bridge rectifier BR without being switched, without a main switch. The switch-mode power supply I is thus always connected to the electrical power supply system whenever the mains plug of the appliance is connected to the electrical power supply system. In consequence, the power factor coil NS is not arranged in the current path of the mains switch S1, so that the life of the mains switch S1 is considerably improved.

Further refinements of the invention are within the scope of a person skilled in the art. The invention is not restricted to switch-mode power supplies based on the flyback converter principle, as already explained above, and can also be used for other switch-mode power supply concepts when power factor correction is required. The invention can also be used in appliances which do not have power factor correction. Thus, for example, the connection points e and f can be short-circuited in appliances for countries which do not require power factor correction. In consequence, there is no need to modify the chassis in these appliances for these countries.

The invention claimed is:

1. Circuit arrangement having a mains connection, a mains switch with a first switching contact and a second switching contact, a demagnetization coil and a switch-mode power supply, comprising:
    a driver circuit;
    a transformer with a primary winding and an auxiliary winding, said auxiliary winding providing a supply voltage for said driver circuit;
    a switching transistor coupled in series with said primary winding and said driver circuit producing a control voltage for said switching transistor;
    a bridge rectifier for rectifying a mains voltage provided by said mains connection; and
    an energy storage capacitor coupled between said bridge rectifier and said primary winding;
    said circuit arrangement comprising further a power factor coil for power factor correction, which is arranged between said mains connection and said bridge rectifier, wherein
    said first switching contact is arranged between said mains connection and said demagnetization coil for switching said demagnetization coil on and off, and
    said second switching contact is arranged between said auxiliary winding and said drive circuit for switching off said supply voltage.

2. The circuit arrangement as claimed in claim 1, wherein a diode and a second capacitor are coupled to a connection of said auxiliary winding in order to rectify and smooth said supply voltage, and wherein said second switching contact is arranged between said second capacitor and said driver circuit.

3. The circuit arrangement as claimed in claim 1, further comprising a mains filter, a first parallel capacitor coupled between said mains filter and said mains connection and a second parallel capacitor coupled between said mains filter and said bridge rectifier, wherein said demagnetization coil is arranged in parallel to said second parallel capacitor and in parallel to said bridge rectifier, and wherein two connections of said first switching contact are connected in series between said second parallel capacitor and said demagnetization coil for switching said demagnetization coil on and off.

4. The circuit arrangement as claimed in claim 3, wherein a posistor is arranged in series between said first switching contact and said demagnetization coil.

5. The circuit arrangement according to claim 1, wherein said circuit arrangement is included in an appliance.

6. The circuit arrangement according to claim 5, wherein said appliance comprises a picture tube, and wherein said demagnetization coil is mounted on said picture tube.

7. Circuit arrangement having a mains connection, a mains switch with a first and a second switching contact, a demagnetization coil, and a switch-mode power supply comprising:
    a drive circuit;
    a transformer with a primary winding and an auxiliary winding, said auxiliary winding providing a supply voltage for said driver circuit;
    a switching transistor coupled in series with said primary winding and said driver circuit producing a control voltage for said switching transistor;
    a bridge rectifier for rectifying a mains voltage provided by said mains connection; and
    an energy-storage capacitor coupled between said bridge rectifier and said primary winding;
    said circuit arrangement comprising further a power factor coil for power factor correction, which is arranged between said mains connection and said bridge rectifier, wherein
    said first switching contact is arranged between said mains connection and said demagnetization coil for switching said demagnetization coil on and off, and
    said second switching contact is arranged for switching off a control voltage for said driver circuit in order to switch off said switching transistor.

8. The circuit arrangement as claimed in claim 5, wherein a diode and a second capacitor are coupled to a connection of said auxiliary winding in order to rectify and smooth said supply voltage, and wherein said second switching contact is arranged between said second capacitor and said driver circuit.

9. The circuit arrangement as claimed in claim 5, comprising further a mains filter, a first parallel capacitor coupled between said mains filter and said mains connection and a second parallel capacitor coupled between said mains filter and said bridge rectifier, wherein said demagnetization coil is arranged in parallel to said second parallel capacitor and in parallel to said bridge rectifier, and wherein two connections of said first switching contact are connected in series between said second parallel capacitor and said demagnetization coil for switching said demagnetization coil on and off.

10. The circuit arrangement as claimed in claim 7, wherein a posistor is arranged in series between said first switching contact and said demagnetization coil.

11. The circuit arrangement according to claim 5, wherein said circuit arrangement is included in an appliance.

12. The circuit arrangement according to claim 5, wherein said appliance comprises a picture tube, and wherein said demagnetization coil is mounted on said picture tube.

* * * * *